(12) United States Patent
Robles Flores

(10) Patent No.: US 9,007,615 B2
(45) Date of Patent: Apr. 14, 2015

(54) METHOD AND APPARATUS FOR THICK PAPER IMAGE BORDER OPTIMIZATION

(71) Applicant: Xerox Corporation, Norwalk, CT (US)

(72) Inventor: Eliud Robles Flores, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 13/749,441

(22) Filed: Jan. 24, 2013

(65) Prior Publication Data

US 2014/0204405 A1 Jul. 24, 2014

(51) Int. Cl.
*G06K 15/00* (2006.01)
*H04N 1/00* (2006.01)

(52) U.S. Cl.
CPC .............. *G06K 15/4065* (2013.01); *H04N 1/00* (2013.01)

(58) Field of Classification Search
CPC .................................................. G03G 15/5095
USPC ................ 358/1.1, 1.14, 1.15, 1.18, 1.5, 3.24
See application file for complete search history.

(56) References Cited

U.S. PATENT DOCUMENTS

| 7,788,580 | B1 * | 8/2010 | Goodwin et al. | 715/243 |
| 8,619,332 | B2 * | 12/2013 | Karito et al. | 358/3.12 |
| 2003/0133162 | A1 * | 7/2003 | Lupien et al. | 358/3.26 |
| 2010/0053696 | A1 * | 3/2010 | Sasano et al. | 358/449 |
| 2010/0230154 | A1 * | 9/2010 | Naito et al. | 174/389 |
| 2011/0058873 | A1 * | 3/2011 | Honda et al. | 399/406 |
| 2011/0179351 | A1 * | 7/2011 | Capela et al. | 715/244 |

* cited by examiner

*Primary Examiner* — Allen H Nguyen

(57) ABSTRACT

A method, non-transitory computer readable medium, and apparatus for optimizing printing of an image on a non-optimal medium are disclosed. For example, the method analyzes one or more characteristics of a medium, determines that the medium is a non-optimal medium based upon the one or more characteristics that are analyzed, determines if an alternate medium having optimal medium characteristics is available, determines if a print parameter modification is available, increases a minimum border width of the non-optimal medium such that a sum of the minimum border width of each side of the non-optimal medium is greater than a pre-defined percentage of a width of the non-optimal medium if the alternate medium and the print parameter modification are not available, and prints the image on the non-optimal medium using the minimum border width.

20 Claims, 4 Drawing Sheets

METHOD AND APPARATUS FOR THICK PAPER IMAGE BORDER OPTIMIZATION

The present disclosure relates generally to optimizing printing based upon characteristics of a medium and, more particularly, to a method and an apparatus for optimizing printing on a non-optimal medium to reduce banding artifacts.

BACKGROUND

Currently used printing solutions and systems are optimized for media having particular characteristics. However, certain applications require different media characteristics that may not be optimized for the currently used printing solutions and systems.

For example, using the current printing solutions and systems on non-optimal media can create disturbances in the transfer zone of a printer due the media "stubbing on" or "flicking off" paper path components on the lead edge and trail edge while in the transfer zone. In addition, the non-optimal media may have a high curl, thereby, creating a high level of drag. These disturbances can create severe banding artifacts that are undesirable.

SUMMARY

According to aspects illustrated herein, there are provided a method, a non-transitory computer readable medium, and an apparatus for optimizing printing of an image on a non-optimal medium. One disclosed feature of the embodiments is a method that analyzes one or more characteristics of a medium, determines that the medium is a non-optimal medium based upon the one or more characteristics that are analyzed, determines if an alternate medium having optimal media characteristics is available, determines if a print parameter modification is available, increases a minimum border width of the non-optimal medium such that a sum of the minimum border width of each side of the non-optimal medium is greater than a pre-defined percentage of a width of the non-optimal medium if the alternate medium and the print parameter modification are not available and prints the image on the non-optimal medium using the minimum border width.

Another disclosed feature of the embodiments is a non-transitory computer-readable medium having stored thereon a plurality of instructions, the plurality of instructions including instructions which, when executed by a processor, cause the processor to perform a method that analyzes one or more characteristics of a medium, determines that the medium is a non-optimal medium based upon the one or more characteristics that are analyzed, determines if an alternate medium having optimal medium characteristics is available, determines if a print parameter modification is available, increases a minimum border width of the non-optimal medium such that a sum of the minimum border width of each side of the non-optimal medium is greater than a pre-defined percentage of a width of the non-optimal medium if the alternate medium and the print parameter modification are not available and prints the image on the non-optimal medium using the minimum border width.

Another disclosed feature of the embodiments is an apparatus comprising a processor that is configured to analyze one or more characteristics of a medium, determine that the medium is a non-optimal medium based upon the one or more characteristics that are analyzed, determine if an alternate medium having optimal medium characteristics is available, determine if a print parameter modification is available, increase a minimum border width of the non-optimal medium such that a sum of the minimum border width of each side of the non-optimal medium is greater than a pre-defined percentage of a width of the non-optimal medium if the alternate medium and the print parameter modification are not available and print the image on the non-optimal medium using the minimum border width.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for optimizing printing of an image on a non-optimal medium. As discussed above, currently used printing solutions and systems are optimized for media having particular characteristics. However, certain applications require different media characteristics that may not be optimized for the currently used printing solutions and systems.

One embodiment of the present disclosure provides the ability to print an image on non-optimal media even if no alternative media or print parameter modifications are available. As a result, a customer may print the image they want on any type of media they desire, which results in a more satisfied customer.

Figure 1:
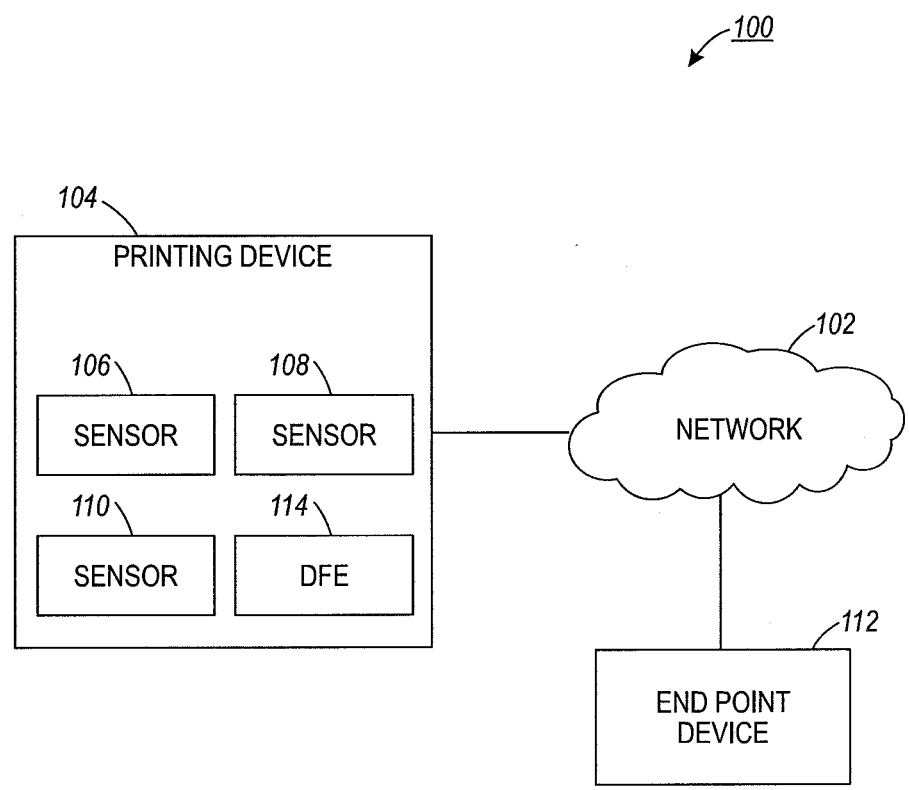
FIG. 1 illustrates one example of a communication network of the present disclosure.

To better understand the present disclosure, FIG. 1 illustrates an example of a system 100. In one embodiment, the system 100 may be implemented as part of a next generation packaging printing system. In one embodiment, the system 100 includes a printing device 104 and an endpoint device 112 that communicate over a packet network such as an Internet Protocol (IP) network 102. The IP network 102 may be, for example, the Internet, a service provider network, an access network, a core network, a local area network, and the like.

In one embodiment, the printing device 104 may include general personal computing capabilities similar to the general computing device described below and illustrated in FIG. 4. In one embodiment, the printing device 104 may be a multi-function device (MFD) that includes at least two different functions including, for example, digital image processing capability, electronic communication capability (e.g., email transmission, electronic file transmission, and the like), scanning capability, faxing capability, copying capability, printing capability, interfacing capability with a user via a graphical user interface with or without a touch screen, one or more input and output devices, and the like.

In one embodiment, the printing device 104 may include a digital front end (DFE) 114 and one or more sensors 106, 108 and 110. The DFE 114 may provide the processing capability of the methods and functions described herein. Although the DFE 114 is illustrated as being in the printing device 104, the DFE 114 may also be remotely located from the printing device 104, for example, in an application server in the network 102.

In one embodiment, the one or more sensors 106, 108 and 110 may be different types of sensors to detect various characteristics of a medium that is fed into the printing device 104 to print an image. For example, the sensor 106 may be a resistivity sensor to detect a level of moisture in the medium. The sensor 108 may be a sensor to detect an amount of curl in the medium. The sensor 110 may be a sensor to detect a type of finish of the medium. Although three sensors are illustrated, the printing device may have any number of sensors. For example, no sensors may be needed if the characteristics of the medium is pre-determined and provided to the printing device 104 before printing the image.

In one embodiment, the end point device 112 may be any device capable of communicating with the printing device 104 over the IP network 102. For example, the end point device 112 may be a desktop computer, a laptop computer, a mobile endpoint device, a smart phone, a tablet computer, a netbook computer, and the like. It should be noted that the end point device 112 may be optional. For example, the user may initiate a print job at the printing device 104 locally or may initiate a print job at the endpoint device 112 that is located remotely from the printing device 104.

As noted above, if the medium is not optimal for the image that a user wishes to print, then the printed image may have undesirable defects. For example, using the current printing solutions and systems on a non-optimal medium can create disturbances in the transfer zone of a printer due the medium "stubbing on" or "flicking off" paper path components on the lead edge and trail edge while in the transfer zone. For example, heavier medium may also be thicker and stiffer, which may lead to formation of banding artifacts during printing. In addition, the non-optimal medium may have a particular width or a high curl, thereby, creating a high level of drag. These characteristics can create disturbances which can lead to severe banding artifacts that are undesirable.

Figure 2:
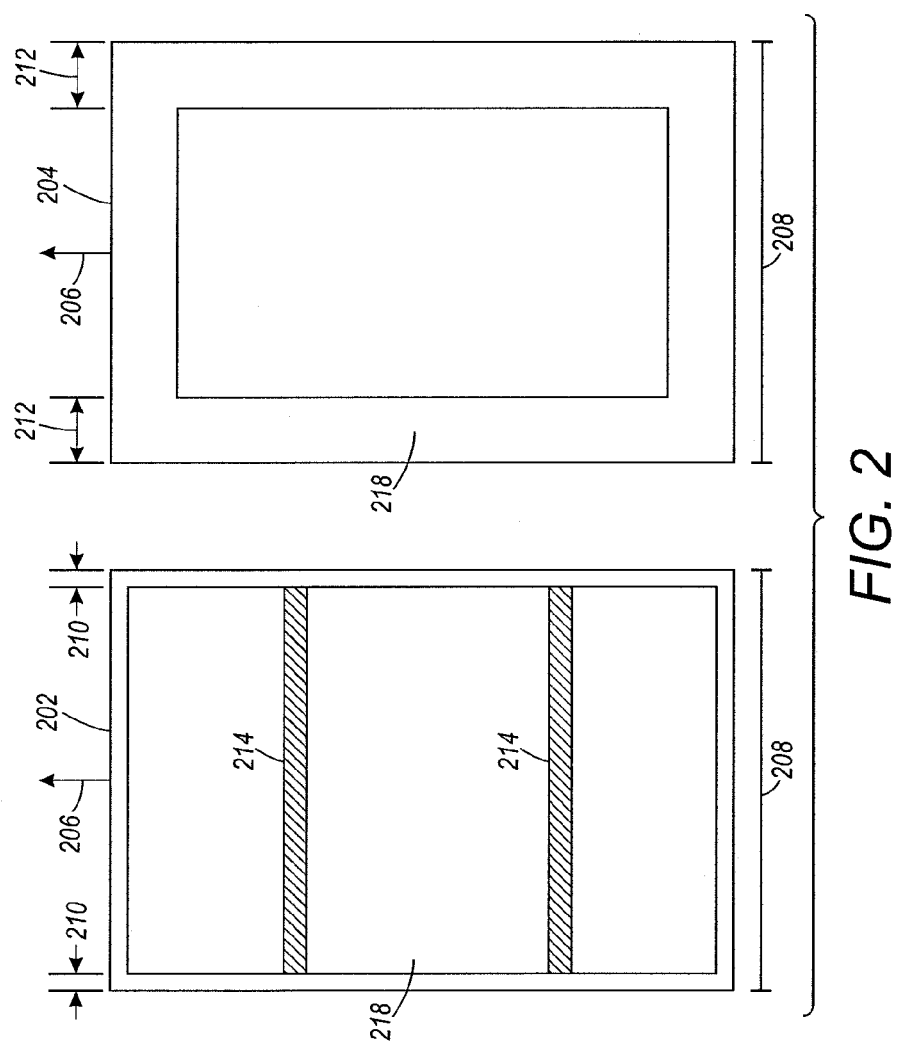
FIG. 2 illustrates examples of identical images printed on non-optimal media with different border widths.

FIG. 2 illustrates one example of a non-optimal medium 202 that is used to print an image 218 having one or more artifacts 214. The non-optimal medium 202 may have a default border width 210. For example, the sum of each default border width 210 on each side may be less than a predefined percentage of a width 208 of the non-optimal medium 202. In one embodiment, the predefined percentage may be between 10-15%. In another embodiment, the predefined percentage may be approximately 13%. In the example illustrated in FIG. 2, the non-optimal medium 202 may be approximately 14.33 inches (in) (363.982 millimeters (mm)) wide and have a default border width 210 of approximately 3 mm. Thus, the sum of the default border width 210 is 6 mm, which is only 1.6% of the width 208.

In one embodiment, the width 208 may be defined as a dimension perpendicular to a feed direction 206 of the non-optimal medium. In other words, in one embodiment, the width 208 is not relative to another dimension of the non-optimal medium 202 (e.g., length vs. width), but rather relative to the feed direction 206. In other words, the "length" may actually become the width if the non-optimal medium were rotated 90 degrees and fed in the feed direction 206.

In one embodiment, the medium may be a print medium or media, for example, paper. As discussed above, the DFE 114 may analyze one or more characteristics of the image to be printed and the medium before the image is printed to determine if the medium is optimal for printing the requested image or if changes need to be made before printing. For example, if the image is text, any type of medium may likely be optimal. However, if the image is a picture or a halftone image the characteristics of the medium may determine whether or not the medium is optimal for printing the image. In one embodiment, if the image has more than a predefined amount of white space in each line across a width of the medium, then any type of medium may be used. In one embodiment, the predefined amount may be greater than 10% of the width of the medium. In one embodiment, a subsection of the image equivalent to an area or a size of a transfer nip of the printer device 104 may be analyzed to determine if the image has more than a predefined amount of white space in each line across a width of the medium within the subsection that is analyzed.

However, if the image requires a particular type of medium to be used due to the image type or an insufficient amount of white space, the DFE 114 may analyze the characteristics of the medium as noted above. The one or more characteristics may include, for example, a grammage of the medium, a moisture content of the medium, an amount of curl of the medium, a finish of the medium, a thickness of the medium, and the like. For example, if the grammage is below a pre-defined grammage value, the medium may be determined to be optimal. In one embodiment, the predefined grammage value may be a function of the packaging printing system's capabilities. In one embodiment, the predefined grammage value may be, for example, 300 grams per square meter (gsm).

However, if the grammage is above the predefined grammage value, the DFE 114 may analyze other characteristics to determine if the image can still be printed on the non-optimal medium. For example, if the medium has an amount of curl less than a predefined curl value, a moisture content above a predefined moisture value, a pre-defined grain direction and a predefined finish, the image may still be printed on the non-optimal medium. For example, such predefined values may include a curl of less than 4 millimeters (mm), a moisture content greater than 4%, a long grain direction and a coated 2 side (C2S) finish.

If the grammage is above the predefined grammage value and the DFE 114 determines that the other characteristics are still non-optimal, then one or more changes can be made if available. For example, an alternate optimal type of medium may be used or one or more print parameter modifications may be used. The one or more print parameter modifications may be modifications to a toner content color recipe to reduce a height of the toner pile.

However, if no alternate optimal type of medium is available or one or more print parameter modifications are unavailable, the image may still be printed on the non-optimal medium. Alternatively, the user or customer may not find the alternative medium or print parameter modifications to be acceptable and require that the image be printed on the non-optimal medium. In one embodiment, the border width may be modified to optimize printing of the image on the non-optimal medium. As a result, the undesirable artifacts may be avoided even though the image is printed on the non-optimal medium.

In one embodiment, the border width may be changed to provide sufficient white space and, thereby, avoiding the undesirable artifacts from being produced on the non-optimal medium. In one embodiment, the border width may be increased such that a sum of the border width of each side of the non-optimal medium is greater than a predefined percentage of the overall width of the non-optimal medium.

Referring back to FIG. 2, FIG. 2 illustrates a non-optimal medium 204 having the border width 212 adjusted. The non-optimal medium 204 may have identical characteristics (e.g., grammage, moisture content, finish, coating, grain direction, thickness, width 208, print direction 206, and the like) and print the identical image 218 that was printed on the non-optimal medium 202. However, the image may be printed without the artifacts 214 that appear in the non-optimal medium 204 by adjusted the border width 212.

In one embodiment, this may be achieved by adjusting a minimum border width such that a sum of the minimum border width of each side of the non-optimal medium 202 is greater than a predefined percentage of the overall width 208 of the non-optimal medium 202. In one embodiment, the predefined percentage may be approximately 10%-15%. In one embodiment, the predefined percentage may be approximately 13%.

In the example illustrated in FIG. 2, the non-optimal medium 204 may be approximately 14.33 in (363.982 mm) wide and have a border width 212 to be increased to approximately 24 mm. Thus, the sum of the border width 212 is 48 mm, which is approximately 13% of the width 208. Notably, by increasing the border width to have a minimum border width of at least 24 mm produces a printed image that is devoid of any artifacts 214 seen in the non-optimal medium 202. As a result, one embodiment of the present disclosure allows a users or customers to print their image on any type of a medium even if the medium is deemed to be non-optimal.

Figure 3:
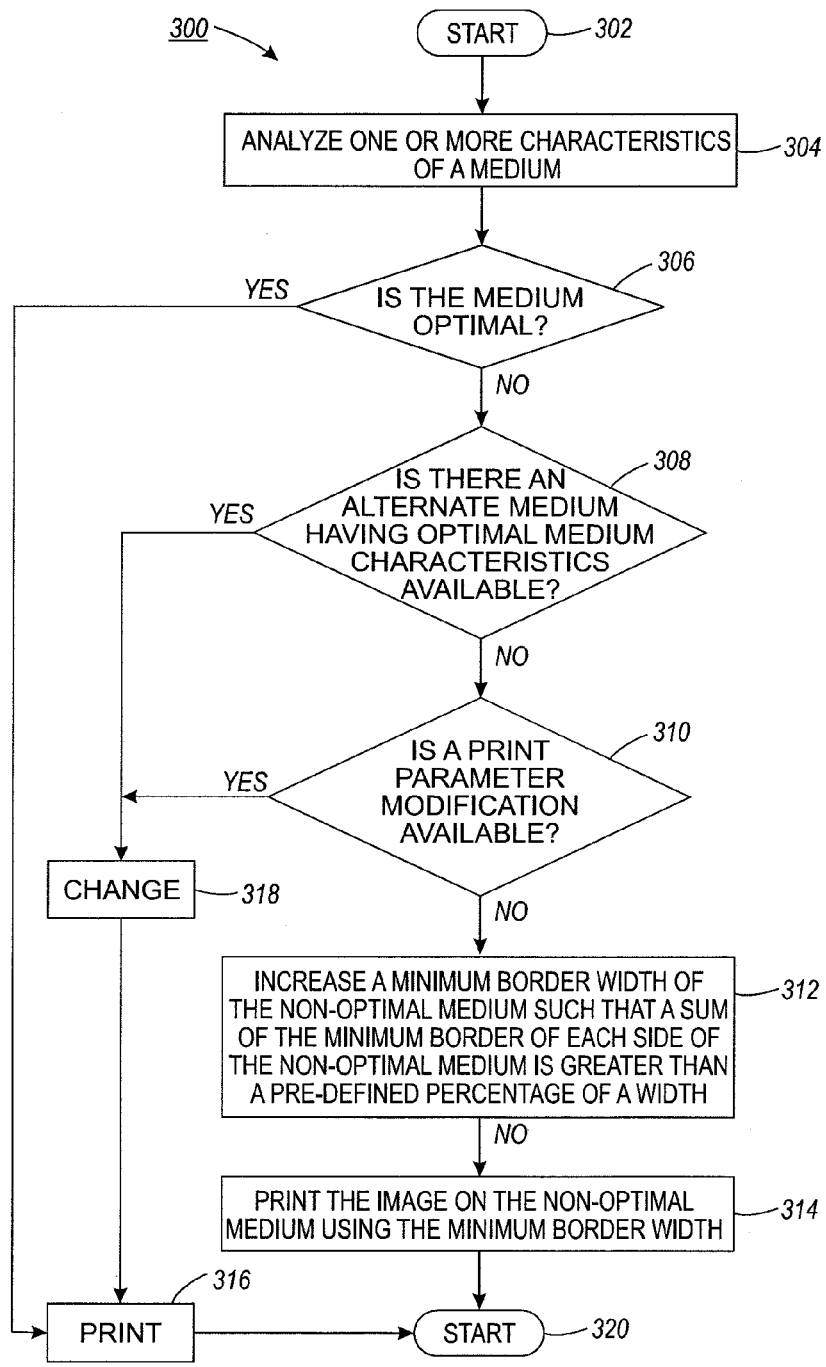
FIG. 3 illustrates an example flowchart of one embodiment of a method for optimizing printing of an image on a non-optimal medium.

FIG. 3 illustrates a flowchart of a method 300 for optimizing printing of an image on a non-optimal medium. In one embodiment, the method 300 may be performed by the DFE 114, the printing device 104 or a general-purpose computer as illustrated in FIG. 4 and discussed below.

The method 300 begins at step 302. At step 304, the method 300 may analyze one or more characteristics of a medium. In one embodiment, the medium may be any print medium, such as paper, for example. In one embodiment, the characteristics of the medium may be analyzed to determine if the medium is optimal for an image that has less than 15% white space per line. In other words, the image to be printed on the medium is a non-text image. Said another way, the image is a picture or half tone image. In one embodiment, the characteristics may include, for example, a grammage of the medium, a moisture content of the medium, an amount of curl of the medium, a finish of the medium, a thickness of the medium, and the like.

At step 306, the method 300 determines if the medium is optimal. For example, the medium may be determined to be optimal if the medium has a grammage below a predefined grammage value. In one embodiment, for a particular packaging print solution, the predefined grammage value may be approximately 300 gsm.

In one embodiment, even if the medium has a grammage above the predefined grammage value, the medium may be still optimal if other characteristics are met. For example, if the medium has an amount of curl less than a predefined curl value, a moisture content above a predefined moisture value, a pre-defined grain direction and a predefined finish, the image may still be printed on the medium. For example, such predefined values may include a curl of less than 4 millimeters (mm), a moisture content greater than 4%, a long grain direction and a C25 finish.

It should be noted that the values provided above for the various predefined values are only provided as examples and should not be considered as limiting. The predefined values may vary depending on the particular printing system that is used or a particular printing application.

At step 306, if the medium is determined to be optimal, the method 300 may proceed to step 316 where the image is printed on the medium. The method then ends at step 320.

However, if the medium is determined not to be optimal (i.e., non-optimal), the method 300 proceeds to step 308. At step 308, the method 300 determines if there is an alternate medium having optimal medium characteristics available. For example, using the above example, an alternate medium having a grammage less than 300 gsm may be available and can be used in place of the initially selected medium having a grammage greater than 300 gsm. Alternatively, an alternate medium having optical characteristics, such as for example, an amount of curl less than a predefined curl value, a moisture content above a predefined moisture value, a pre-defined grain direction and a predefined finish.

If an alternate medium having optimal medium characteristics is available and acceptable to the user or customer at step 308, the method 300 may proceed to step 318, where the medium is changed. The method 300 may then proceed to step 316 to print. The method ends at step 320.

However, if no alternate medium having optimal medium characteristics is available, or the user or customer elects not to use an alternate medium even if one is available, the method 300 may proceed to step 310. At step 310, the method determines if a print parameter modification is available. For example, the print parameter modifications may be modifications to a toner content color recipe to reduce a height of the toner pile.

If a print parameter modification is available and acceptable to a user or customer, the method 300 may proceed to step 318 where the print parameter modification is changed. The method 300 may then proceed to step 316 to print. The method ends at step 320.

However, if a print parameter modification is not available or the user or customer elects not to proceed with the print parameter modification, even if one is available, the method 300 may proceed to step 312. At step 312, the method 300 may increase a minimum border width of the non-optimal medium such that a sum of the minimum border width of each side of the non-optimal medium is greater than a predefined percentage of the a width of the non-optimal medium. In one embodiment, the predefined percentage may be approximately 10%-15%. In one embodiment, the predefined percentage may be approximately 13%.

For example, the non-optimal medium may be approximately 14.33 in (363.982 mm) wide and have a border width increased from approximately 3 mm to approximately 24 mm. Thus, the sum of the border width 212 is increased from 6 mm to 48 mm, which is approximately a change from 1.6% to 13% of the width of the non-optimal medium. In the present example, by increasing the border width to have a minimum border width of at least 24 mm produces a printed image that is devoid of any artifacts seen in the same image printed the non-optimal medium 202. As a result, one embodiment of the present disclosure allows a users or customers to print their image on any type of medium even if the medium is deemed to be non-optimal.

At step 314, the method 300 prints the image on the non-optimal medium using the minimum border width. For example, the minimum border width may be the increased minimum border width as described in step 312. The method ends at step 320.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

Figure 4:
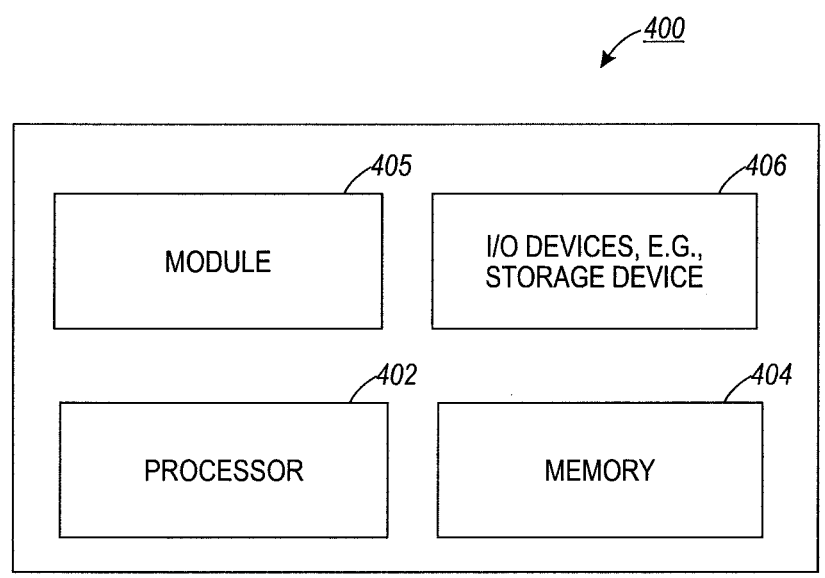
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a microprocessor, a central processing unit (CPU) and the like), a memory 404, e.g., random access memory (RAM) and/or read only memory (ROM), a module 405 for optimizing printing of an image on a non-optimal medium, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for optimizing printing of an image on a non-optimal medium can be loaded into memory 404 and executed by processor 402 to implement the functions as discussed above. As such, the present method 405 for optimizing printing of an image on a non-optimal medium (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for optimizing printing of an image, comprising:
    analyzing, by a processor, one or more characteristics of a medium and the image;
    determining, by the processor, that the medium is non-optimal based upon the one or more characteristics of the medium and the image that are analyzed, wherein the one or more characteristics of the image comprise having a white space in a line of the image that is not greater than 10% of a width of the medium;
    increasing, by the processor, a minimum border width of the medium such that a sum of the minimum border width of each side of the medium is greater than a percentage of the width of the medium; and
    printing, by the processor, the image on the medium using the minimum border width.

2. The method of claim 1, wherein the one or more characteristics comprise at least one of: a moisture content, an amount of curl, a thickness, a grammage or a finish.

3. The method of claim 1, wherein the one or more characteristics of the medium are analyzed by a digital front end.

4. The method of claim 1, wherein the medium is determined to be non-optimal when a grammage of the medium is greater than approximately 300 grams per square meter (gsm).

5. The method of claim 1, further comprising:
    determining, by the processor, if an alternate medium having optimal medium characteristics is available; and
    determining, by the processor, if a print parameter modification is available.

6. The method of claim 5, wherein the alternate medium that has the optimal medium characteristics comprises a grammage less than a grammage value or a curl less than a curl value, a moisture content above a moisture value, a grain direction and a finish and wherein the print parameter modification comprises a change in a toner content color recipe.

7. The method of claim 1, wherein the percentage of the width is approximately 10% to 15% of the width of the medium.

8. The method of claim 7, wherein the width of the medium comprises a direction perpendicular to a print direction.

9. The method of claim 1, further comprising:
    displaying a warning message when the medium is determined to be non-optimal.

10. A non-transitory computer-readable medium storing a plurality of instructions, which when executed by a processor, cause the processor to perform operations for optimizing printing of an image, the operations comprising:
    analyzing one or more characteristics of a medium and the image;
    determining that the medium is non-optimal based upon the one or more characteristics of the medium and the image that are analyzed, wherein the one or more characteristics of the image comprise having a white space in a line of the image that is not greater than 10% of a width of the medium;
    increasing a minimum border width of the medium such that a sum of the minimum border width of each side of the medium is greater than a percentage of the width of the medium; and
    printing the image on the medium using the minimum border width.

11. The non-transitory computer-readable medium of claim 10, wherein the one or more characteristics comprise at least one of: a moisture content, an amount of curl, a thickness, a grammage or a finish.

12. The non-transitory computer-readable medium of claim 10, wherein the one or more characteristics of the medium are analyzed by a digital front end.

13. The non-transitory computer-readable medium of claim 10, wherein the medium is determined to be non-optimal when a grammage of the medium is greater than approximately 300 grams per square meter (gsm).

14. The non-transitory computer-readable medium of claim 10, further comprising:
    determining if an alternate medium having optimal medium characteristics is available; and
    determining if a print parameter modification is available.

15. The non-transitory computer-readable medium of claim 14, wherein the alternate medium that has optimal medium characteristics comprises a grammage less than a grammage value or a curl less than a curl value, a moisture content above a moisture value, a grain direction and a finish and wherein the print parameter modification comprises a change in a toner content color recipe.

16. The non-transitory computer-readable medium of claim 10, wherein the percentage of the width is approximately 10% to 15% of the width of the medium.

17. The non-transitory computer-readable medium of claim 16, wherein the width of the medium comprises a direction perpendicular to a print direction.

18. The non-transitory computer-readable medium of claim 10, further comprising:
   displaying a warning message when the medium is determined to be non-optimal.

19. A method for optimizing printing of an image, comprising:
   analyzing the image and a grammage value of a paper used to print the image, wherein the image comprises a non-text image;
   determining that the paper has a non-optimal grammage greater than a threshold value and that the image has a white space in a line that is not greater than 10% of a width of the paper;
   determining if an alternate paper having an optimal grammage lower than the threshold value is available;
   determining if a modification to a toner content color recipe is available;
   increasing a minimum border width of the paper such that a sum of the minimum border width of each side of the paper is greater than a percentage of the width of the paper if the alternate paper and the modification to the toner content are not available; and
   printing the image on the paper using the minimum border width.

20. The method of claim 19, wherein the percentage of the width is approximately 10% to 15% of the width of the paper.

* * * * *